A. B. BEAN.

MACHINE-CLUTCHES.

No. 6,791. Reissued Dec. 14, 1875.

Witnesses.

J. N. Shumway

Clara Broughton.

Albert B. Bean

By Atty's Inventor

Wm. P. Emle

N. PETERS, PHOTO-LITHOGRAPHER, WASHINGTON, D. C.

UNITED STATES PATENT OFFICE.

ALBERT B. BEAN, OF NEW HAVEN, CONNECTICUT.

IMPROVEMENT IN MACHINE-CLUTCHES.

Specification forming part of Letters Patent No. 148,165, dated March 3, 1874; reissue No. 6,215, dated January 12, 1875; reissue No. 6,791, dated December 14, 1875; application filed November 23, 1875.

*To all whom it may concern:*

Be it known that I, ALBERT B. BEAN, of New Haven, in the county of New Haven and State of Connecticut, have invented a new Improvement in Machine-Clutches; and I do hereby declare the following, when taken in connection with the accompanying drawings and the letters of reference marked thereon, to be a full, clear, and exact description of the same, and which said drawings constitute part of this specification, and represent, in—

Figure 1:
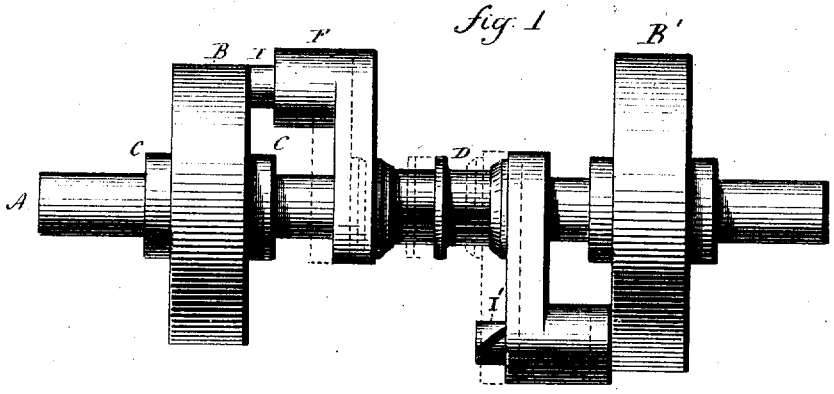
Figure 2:
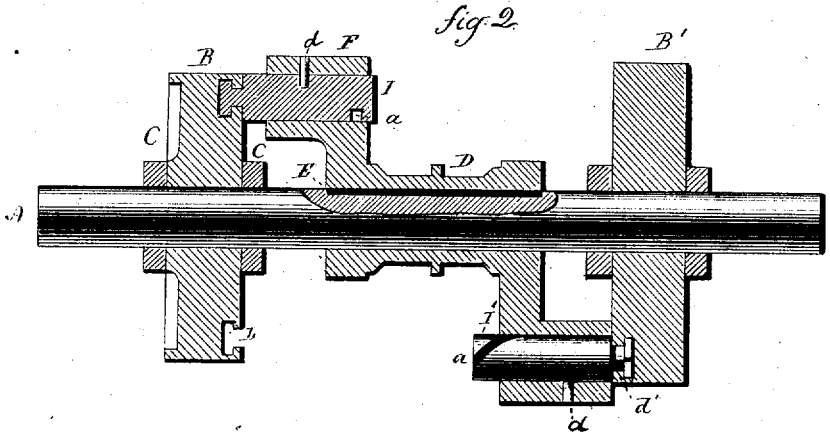

Figure 1, front view; Fig. 2, longitudinal section.

This invention relates to an improvement in what is known as "machinery-clutch"—that is to say, a device by which to connect or disconnect a pulley with the shaft upon which it is placed, so that when required the revolution of the driven pulley may be communicated to the other.

By the term "pulley" in this specification I wish to be understood as including gears, or whatever device it may be, for receiving or communicating power.

This invention consists, first, in a pulley constructed with a concentric groove or flange of substantially T shape in radial section, and loose upon the shaft, combined with mechanism in connection with the shaft, whereby, through said groove or flange, the pulley is engaged with or disengaged from the said shaft; and, second, in combining a sleeve on the shaft, constructed so as to revolve with the shaft, but to have a free longitudinal movement thereon, and a pulley loose upon or independent of the said shaft, with a bar arranged in connection, and so as to revolve, with the said sleeve, and also in connection with said pulley, and constructed so that a longitudinal movement of the said sleeve will impart a rotative movement to said bar, and cause it to engage or free the said pulley, accordingly as the sleeve is moved toward or from the said pulley, as more fully hereinafter described.

A is the shaft; B, the pulley, loose upon the shaft, and prevented by the collar C from longitudinal movement. The pulley B is constructed with a concentric groove upon its side, of substantially T shape—that is, broader at the bottom than at its mouth or surface of the pulley, so that a device revolving with the shaft may, by a nut or other clamping device in said groove, make or break connection with the shaft—that is, so as to engage the pulley with or disengage it from the shaft.

The mechanism for thus engaging and disengaging the pulley represented in the accompanying illustration I will now proceed to describe.

D is a sleeve fitted to the shaft, and connected thereto by a spline, E, or other known device which will cause the two to revolve together, and yet allow a free longitudinal movement of the sleeve toward or from the pulley. In connection with the sleeve D, I arrange a bar or bolt, I, parallel, or nearly so, to the shaft, (here represented as fitted in the arm,) so as to allow the free longitudinal movement of the arm over the bar. To the bar I a rotative movement is imparted by the longitudinal movement of the sleeve, (here represented as by means of a spiral groove, *a*,) into which a stud, *d*, in the arm sits, so that a longitudinal movement of the sleeve will, through the said stud and spiral groove, impart the required rotative movement to the bar. The end of the bar I next the pulley is connected to the pulley, so that the rotation of the bar in one direction will engage the pulley and cause it to revolve with the bar, sleeve, and shaft; but the rotation of the bar in the opposite direction will disengage the pulley and free it from the action of or upon the shaft, as the case may be. This connection I prefer to make as represented—that is, by the T-shaped groove L in the side of the pulley, into which a nut, *d'*, is placed and prevented from turning; and the end of the bar I construct with a thread corresponding to said nut, as seen in Fig. 1, and the nut and arm sit so close together that the rotation imparted to the bar from the sleeve, as by moving the sleeve to the position denoted in broken lines, Fig. 1, will bind or clamp the pulley between them with sufficient force to couple the shaft and pulley together, and the return of the sleeve causes a corresponding disconnection, and when so disconnected the nut is free to run around the groove L when the shaft is turned and the pulley stationary, or to remain stationary with the shaft while the pulley turns, as the case may be.

In cases where two pulleys are used, as in counter-shafts for screw-cutting lathes, the second pulley B′ is constructed and arranged in like manner with a corresponding bar, I′, so that throwing the sleeve in one direction will engage one pulley, and in the other direction will engage the other, or, in an intermediate position, leave both pulleys free.

This description and illustration will enable those skilled in this class of mechanical devices to apply this invention to other purposes.

I claim as my invention—

1. In a machine-clutch, a pulley constructed with a concentric groove or flange of substantially T shape in radial section, and loose upon the shaft, combined with mechanism, in connection with the shaft, whereby, through said groove or flange, the pulley is engaged with or disengaged from the said shaft, substantially as specified.

2. In combination with a shaft, and pulley loose thereon, and the sleeve D, in connection with said shaft, so as to revolve therewith, but free for longitudinal movement, the bolt or bar I, in connection with the pulley and with the sleeve, so that a longitudinal movement of said sleeve will impart a rotative movement to said bolt or bar, and thereby cause the said bolt to engage the pulley with or disengage it from the shaft, according to the direction of the movement of said sleeve, substantially as described.

3. A clutch-pulley constructed with a T-shaped groove or flange, L, combined with a bolt, I, and a nut, *d′*, in said groove, and means, substantially such as described, for imparting a rotative movement to said bolt, to engage or disengage said pulley.

ALBERT B. BEAN.

Witnesses:
JOHN E. EARLE,
CLARA BROUGHTON.